United States Patent
Horiyama

(10) Patent No.: US 7,561,291 B2
(45) Date of Patent: Jul. 14, 2009

(54) JOB MANAGEMENT SYSTEM, INFORMATION PROCESSING APPARATUS, JOB MANAGEMENT METHOD, JOB MANAGEMENT PROGRAM AND STORAGE MEDIUM STORING THE PROBLEM

(75) Inventor: Jun Horiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/983,966

(22) Filed: Nov. 8, 2004

(65) Prior Publication Data

US 2005/0134905 A1  Jun. 23, 2005

(30) Foreign Application Priority Data

Nov. 7, 2003  (JP) .............................. 2003-378454

(51) Int. Cl.
*G06F 3/12* (2006.01)
*G06K 15/00* (2006.01)

(52) U.S. Cl. ..................... 358/1.15; 358/1.14; 358/1.13

(58) Field of Classification Search ................ 358/1.15, 358/1.16, 1.17, 1.18, 1.14, 1.13, 1.9, 1.6, 358/1.5, 1.4, 1.1, 404, 407, 444, 468; 347/2, 347/3, 5, 23; 399/1, 8, 9, 10, 14, 23, 24; 707/1, 10, 104.1
See application file for complete search history.

(56) References Cited

U.S. PATENT DOCUMENTS

| 5,873,659 A | * | 2/1999 | Edwards et al. ............... 400/61 |
| 7,145,678 B2 | * | 12/2006 | Simpson et al. ............ 358/1.15 |
| 2003/0187619 A1 | | 10/2003 | Lee et al. |

FOREIGN PATENT DOCUMENTS

| JP | 2000-263880 A | 9/2000 |
| JP | 2002-116897 A | 4/2002 |
| JP | 2002-132695 A | 5/2002 |
| JP | 2002-236577 | 8/2002 |
| JP | 2003-280879 A | 10/2003 |
| JP | 2003-288197 A | 10/2003 |
| KR | 10-2001-0109020 A | 12/2001 |

* cited by examiner

*Primary Examiner*—Dov Popovici
(74) *Attorney, Agent, or Firm*—Rossi, Kimms & McDowell, LLP

(57) ABSTRACT

A job management method of managing a job output to at least one peripheral device to thereby manage usage of the peripheral device, which is capable of comparing print information obtained from a printing system and print limitation conditions previously set by a system manager and identifying users who violate the print limitation conditions. Use limitation information for limiting usage of the peripheral device is obtained, and print job information and user information of a user who violates use limitations corresponding to the use limitation information are recorded on a list.

9 Claims, 8 Drawing Sheets

FIG. 9

| | ITEMS | CONTENTS |
|---|---|---|
| 901 | OUTPUT DEVICE | MFP-1 |
| 902 | JOB INFO ACQUIRING METHOD | DEVICE JOB HISTORY |
| 903 | DATE AND TIME | 1999/11/01 pm5 GMT |
| 904 | TYPE OF PAPER | OHP |
| 905 | TOTAL NO. OF PAGES | 7 |
| 906 | NUMBER OF PAGES PRINTED | 4 |
| 907 | SHARED PRINTER | NO |
| 908 | ISSUER | YAMADA TARO |
| 909 | MODE | COLOR |
| 910 | DOCUMENT NAME | CONFIDENTIAL DOCUMENT.txt |
| 911 | SINGLE/ DOUBLE-SIDED INFO | DOUBLE-SIDED |
| 912 | Nin1 INFORMATION | 1 |

JOB MANAGEMENT SYSTEM, INFORMATION PROCESSING APPARATUS, JOB MANAGEMENT METHOD, JOB MANAGEMENT PROGRAM AND STORAGE MEDIUM STORING THE PROBLEM

BACKGROUND OF THE INVENTION

1. Field of the Invention

The present invention relates to a job management system constituting a job accounting system for managing a job account, an information processing apparatus, a job management method, a job management program and a storage medium storing the program.

2. Description of the Related Art

As a method of carrying out authentication of printing when a user uses such peripheral devices as a printer (printing device), a scanner, a copier, or a multi-function peripheral equipment (MFP) that integrates these devices, through a network, there has been known a method in which information obtained by the printer driver API (Application Program Interface) is used.

However, with the above prior art, the information that can be obtained differs depending on a printer driver used, and some information obtained cannot be used for authentication of printing. Therefore, printer drivers which can be used for authentication are limited and hence the user print environment is limited. Thus, the prior art does not necessarily have sufficient flexibility.

SUMMARY OF THE INVENTION

It is an object of the present invention to provide a job management system, an information processing apparatus, a job management method, and a job management program, which are capable of comparing print information obtained from a printing system and print limitation conditions previously set by a system manager and identifying users who violates the print limitation conditions, as well as a storage medium storing the job management program.

To attain the above object, in a first aspect of the present invention, there is provided a job management system comprising a network, a job management apparatus, at least one peripheral device connected to the job management apparatus through the network, and a plurality of information processing apparatuses connected to the job management apparatus and the peripheral device through the network, the information processing apparatuses managing job information output therefrom to the peripheral device to thereby manage usage of the peripheral device, wherein the job management apparatus has a use limitation setting device that sets use limitation information for limiting usage of the peripheral device by the information processing apparatus, the information processing apparatuses each comprises a use limitation information acquiring device that obtains the use limitation information from the job management apparatus, and a use limitation violation recording device that records on a list print job information and user information of a user who violates use limitations corresponding to the use limitation information.

Preferably, the job management system comprises a print inhibiting device that inhibits printing by a user who violates the use limitations.

Preferably, at least one of the information processing apparatuses comprises a print inhibiting device that inhibits printing by a user who violates the use limitations, in addition to the use limitation information acquisition device and the use limitation violation recording device.

According to the first aspect of the present invention, the print job information and the user information of a user who has violated use limitation information that limits usage are recorded on a list. Therefore, a user who has violated the use limitation information can be identified. As a result, print management can be carried out in a more secure and more detailed manner.

To attain the above object, in a second aspect of the present invention, there is provided an information processing apparatus that manages job information output therefrom to at least one peripheral device to thereby manage usage of the peripheral device, comprising a use limitation information acquiring device that obtains use limitation information for limiting usage of the peripheral device, and a use limitation violation recording device that records on a list print job information and user information of a user who violates use limitations corresponding to the use limitation information.

Preferably, the information processing apparatus comprises a print inhibiting device that inhibits printing by a user who violates the use limitations.

Preferably, the use limitation violation recording device allows printing by a user who violates the use limitations corresponding to the use limitation information even when print job information and user information of the user who violates the use limitations are recorded on the list.

To attain the above object, in a third aspect of the present invention, there is provided a job management method of managing a job output to at least one peripheral device to thereby manage usage of the peripheral device, comprising a use limitation information acquiring step of obtaining use limitation information for limiting usage of the peripheral device, and a use limitation violation recording step of recording on a list print job information and user information of a user who violates use limitations corresponding to the use limitation information.

Preferably, the job management method comprises a print inhibiting step of inhibiting printing by a user who violates the use limitations.

Preferably, the peripheral device is one selected from the group consisting of a printer, a copier, and a scanner.

Preferably, the use limitation violation recording step allows printing by a user who violates the use limitations corresponding to the use limitation information even when print job information and user information of the user who violates the use limitations are recorded on the list.

To attain the above object, in a forth aspect of the present invention, there is provided a job management program that causes a computer to execute a job management method of managing a job output to at least one peripheral device to thereby manage usage of the peripheral device, comprising a use limitation information acquiring module that obtains use limitation information for limiting usage of the peripheral device, and a use limitation violation recording module that records on a list print job information and user information of a user who violates use limitations corresponding to the use limitation information.

Preferably, the job management program comprises a print inhibiting module that inhibits printing by a user who violates the use limitations.

To attain the above object, in a fifth aspect of the present invention, there is provided a computer-readable storage medium storing a job management program that causes a computer to execute a job management method that manages a job output to at least one peripheral device to thereby manage use of the peripheral device, the job management program comprising a use limitation information acquiring module that obtains use limitation information for limiting usage of the peripheral device, and a use limitation violation recording module that records on a list print job information and user information of a user who violates use limitations corresponding to the use limitation information.

Preferably, the job management program comprises a print inhibiting module that inhibits printing by a user who violates the use limitations.

To attain the above object, in a sixth aspect of the present invention, there is provided an information processing apparatus that manages job information output to at least one peripheral device to thereby manage usage of the peripheral device, comprising use limitation information acquisition means for obtaining use limitation information for limiting usage of the peripheral device, and use limitation violation recording means for recording on a list print job information and user information of a user who violates use limitations corresponding to the use limitation information.

The above and other objects, features, and advantages of the invention will become more apparent from the following detailed description taken in conjunction with the accompanying drawings.

BRIEF DESCRIPTION OF THE DRAWINGS

FIG. 9 is a diagram showing an example of the job information registered in the job history database appearing in FIG. 7.

DETAILED DESCRIPTION OF THE PREFERRED EMBODIMENTS

The present invention will now be described in detail with reference to the drawings showing a preferred embodiment thereof.

It should be noted that the scope of the present invention, unless specifically stated otherwise, is not limited to the particular relative dispositions of component elements, display screens and so forth described in the embodiment.

Figure 1:
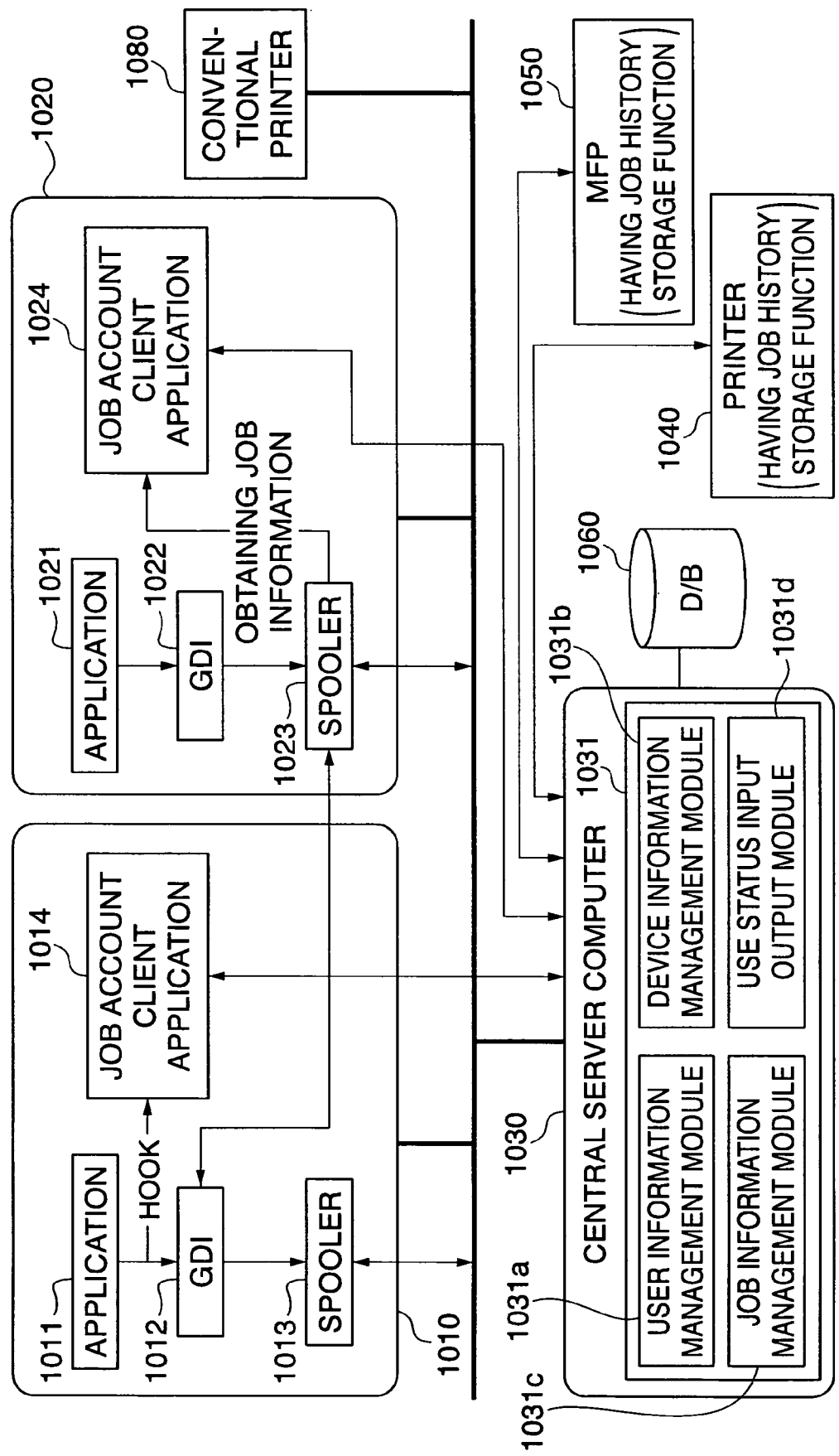
FIG. 1 is a block diagram showing the overall configuration of a job account system including a job management apparatus according to an embodiment of the present invention.

FIG. 1 is a block diagram showing the overall configuration of a job account system including a job management apparatus according to the embodiment of the present invention.

In FIG. 1, reference numerals 1010 and 1020 designate client computers (information processing apparatuses), and reference numeral 1030 designates a central server computer (job management apparatus).

Reference numerals 1040 and 1080 designate printers. However, the printer 1040 is equipped with a capability to hold or store a print job history (job history holding function) whereas the printer 1080 is not equipped with the capability to store a print job history. Reference numeral 1050 designates a MFP (Multi Function Printer). The MFP 1050 is equipped with a plurality of capabilities, including a print function, a copy function, a scanner function, and a print history storage function.

The computers 1010, 1020 and 1030 and the printers 1040, 1050 and 1080 are connected to other devices through a network such that they can communicate with one another.

The client computer 1010 is comprised of an ordinary application 1011, a GDI (Graphics Device Interface) 1012, a spooler 1013, and a job account client application 1014, etc. When the application 1011 calls the GDI 1012, the GDI 1012 generates print data in response to instructions from the application 1011 and transmits the print data to the spooler 1013.

The job account client application 1014 monitors (hooks) the application 1011 accessing the GDI 1012 and accumulates job information relating to the print data. The job information includes such information as the number of pages to be printed and the number of total pages, the print size, the type of paper to be used, whether the printing is single-sided printing or double-sided printing, Nin1 print information (information indicating whether to print N pages of information on a single side of the paper), information relating to a user who issues a print request (user information), information relating to color printing (color information) and information concerning the name of the document to be printed (document name).

The spooler 1013 communicates with the peripheral devices (the printer 1040, the MFP 1050, the printer 1080) through the network and transmits print data if the peripheral devices are ready. The job account client application 1014 periodically transmits accumulated print job information to a job account server application 1031 included in the central server computer 1030.

The client computer 1020 is comprised of an application 1021, a GDI 1022, and a spooler 1023 that work in the same way as the application 1011, GDI 1012, and spooler 1013 of the client computer 1010, respectively. The client computer 1020 further includes a job account client application 1024 and a job account client application 1024. In the case where the client computer 1020 functions as a print server, the client computer 1020 transmits the print data that the GDI 1012 of the client computer 1010 generates to the spooler 1023.

The job account client application 1024 periodically monitors the spooler 1023. If there is a print job spooled to the spooler 1023, the job account client application 1024 uses an API (Application Program Interface) to obtain the print job information, specifically the number of pages discharged, the total number of pages and the document name relating to the print job. The job account client application 1024 transmits the accumulated job information to the job account server application 1031 of the central server computer 1030.

In the case where an OS, not shown, of the client computer 1020 is provided with a capability to inform any other application of a change in the status of the spooler 1023, the job account client application 1024 need not periodically monitor the spooler 1023. In this case, the OS need only inform the job account client application 1024 that a print job has been spooled to the spooler 1023.

The job account server application 1031 that the central serve computer 1030 has includes a user information management module 1031*a*, a device information management module 1031*b*, a job information management module 1031*c* and a use status input output module 1031*d*. Of these, the user information management module 1031*a* stores user information in a storage device, not shown, in the central server computer 1030 for management.

The user information contains a computer log-in name (a name that the user inputs to log in to the computer) and network log-in name (a name that the user inputs to log in to a network system) of a user who uses any of the peripheral devices, and is used to identify a user who has used any of the peripheral devices.

Moreover, the device information management module 1031*b* checks whether the peripheral devices connected to the network have a job history storage function, and stores information on those devices equipped with the job history storage function as well as information on the remaining devices in a storage section, not shown in FIG. 1, in the central server computer 1030 for management.

The device information described above includes the printing speed of the peripheral device, color information, network address and the like.

The job information management module 1031*c* receives job information from the job account client applications 1014, 1024 of the client computers 1010, 1020 and stores the job information in the aforementioned storage device, not shown. Moreover, the job information management module 1031*c* requests job history information of a peripheral device (for example the printer 1040) having a job history storage function, and obtains the job history information through the use status input output module 1031*d*. This process may be carried out at regular intervals. Moreover, when the storage capacity of a job history storage unit, not shown, of a peripheral device is low, the job information management module 1031*c* may inform the use status input output module 1031*d* of that fact and carry out the foregoing process.

The use status input output module 1031*d* obtains information on use status including job history (job information) from a peripheral device having the job history storage function. Moreover, the use status input output module 1031*d* can also output information for requesting output of use status reports (reports indicating how many jobs each user has executed) to peripheral devices such as printers and monitors.

The manager can cause the use status input output module 1031*d* to output use status information to thereby know peripheral device use status. The use status input output module 1031*d* outputs a variety of use statuses based on user information, device information and print history information stored in the storage section. The manager can specify the form of the output (the output format) for the use status input output module 1031*d*. It should be noted that the output use status information is displayed on a display section, not shown, of the central server computer 1030. Moreover, output data concerning output use status information is transmitted to the client computers 1010 and 1020, and the output use status information may be displayed on display sections, not shown, of the client computers 1010 and 1020.

The use status information output includes usage per user (such as the number of pages and the amount of toner used for output) and a total time period over which a peripheral device has been used. Moreover, use status information is also output separately for each peripheral device operating mode (function), such as color printing and double-sided printing. Further, use status information is also output separately for each size of paper used and each type of paper used.

Moreover, use charge information on a peripheral device use charge is set in the peripheral device information, with the use charge information being output separately for each peripheral device or each user. Further, the use charge is set separately for each operating mode, each paper size, and each paper type. Thus, which type of paper, in what operating mode, with which peripheral device, for how much printing and at how much use charge can be output separately for each user.

Moreover, the manager can also set limits on usage separately per function, user, user department, and peripheral device through the user information management module 1031*a* and the device information management module 1031*b*. As limitation information which can be set, there are use charge, total number of pages, number of paper sheets, and the like. The use status input output module 1031*d* checks the print history information against the limits set (limitation information) and where usage exceeds any of the limits, the use status input output module 1031*d* outputs a message to that effect. That output may be accomplished by display output on a display screen, by e-mail or by some other means of communication.

Moreover, where a check of the limits set per user against the print history information indicates that a particular user has exceeded any of the limits, the job information management module 1031*c* causes the client computer 1010 and the associated peripheral device themselves to reject usage by that user. Alternatively, a warning may be issued to that user by display on the display screen, by e-mail or by some other means of communication.

Figure 2:
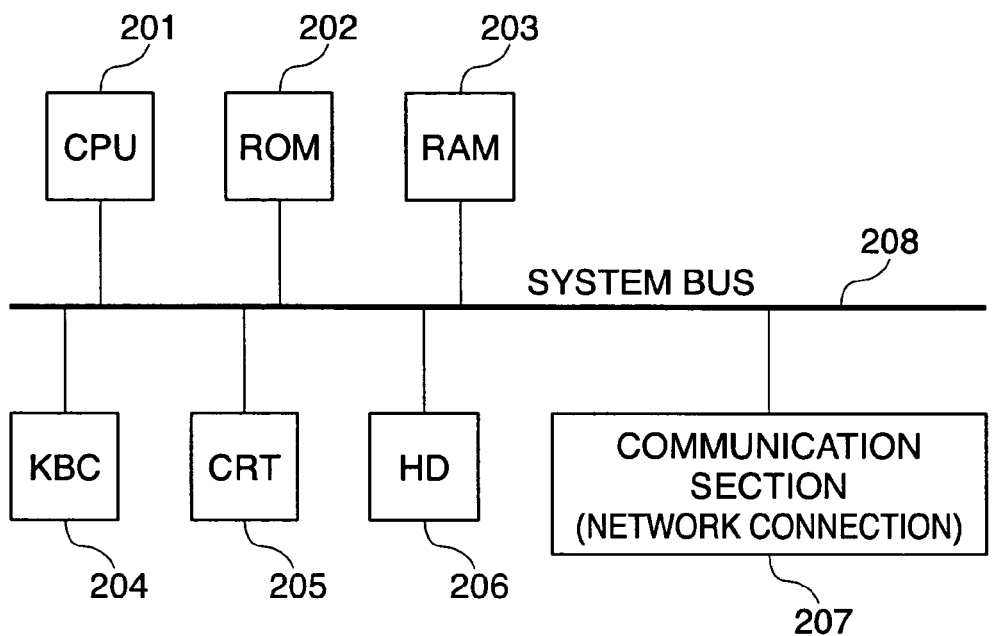
FIG. 2 is a block diagram showing the hardware configuration shared by a client computer and a server computer appearing in FIG. 1.

FIG. 2 is a diagram showing the hardware configuration shared by the client computers 1010, 1020 and the central server computer 1030 shown in FIG. 1.

In FIG. 2, reference numeral 201 designates a CPU (Central Processing Unit). The CPU 201 performs control and computational processing for the computer as a whole.

Reference numeral 202 designates a ROM (Read-Only Memory). The ROM 202 is a storage area in which information such as a system start-up program is stored. Reference numeral 203 designates a RAM (Random Access Memory). The RAM 203 is a data storage area without use limits. The operating system (OS), application programs, a device driver (printer driver) and communication control programs stored on a HD 206, described later, are loaded into the RAM 203 and executed by the CPU 201.

Reference numeral 204 designates a KBC (keyboard controller). The KBC 204 receives input data from a keyboard attached to the computer and transmits the input data to the CPU 201. Reference numeral 205 designates a CRT (display controller), which controls display of a display device. Reference numeral 206 designates the HD (Hard Disk device). It should be noted that the HD 206 may be replaced by another type of external storage device such as a FD (floppy (registered trademark) disk device) or a SRAM (Static Random Access Memory). The HD 206 stores programs and data, which are loaded into the RAM 203 as necessary. For example, if the HD 206 is provided inside the server computer 1030, the user information, device information, and print history information (job history database) are stored thereon.

Reference numeral 207 designates a communication section, which controls network communications. Through the communication section 207, the computer can communicate with other computers and peripheral devices connected to the network.

Reference numeral 208 designates a system bus. Data exchanged between the component elements described above passes through the system bus 208.

Figure 3:
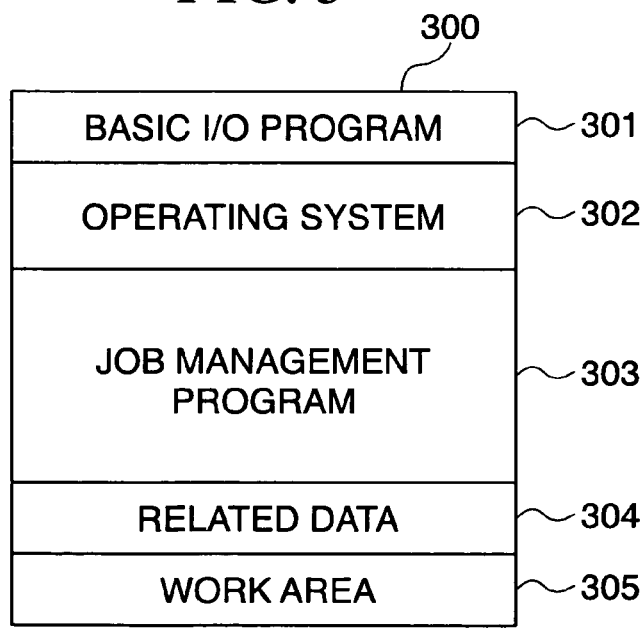
FIG. 3 is a diagram showing a memory map assumed in a state in which a job management program is loaded into a RAM and ready to be executed by a CPU.

FIG. 3 is a diagram showing a memory map assumed in a state in which a job management program is loaded into the RAM 203 and ready to be executed by the CPU 201 shown in FIG. 2. Reference numeral 301 designates a basic I/O program, 302 an operating system such as the Windows (registered trademark) system, 303 a job management program, 304 related data, and 305 a work area used when the CPU 201 executes a program such as the job management program 303.

Moreover, the job management program 303 and the related data 304 are stored on a floppy (registered trademark) disk (FD) or a CD-ROM and supplied to a computer.

Figure 4:
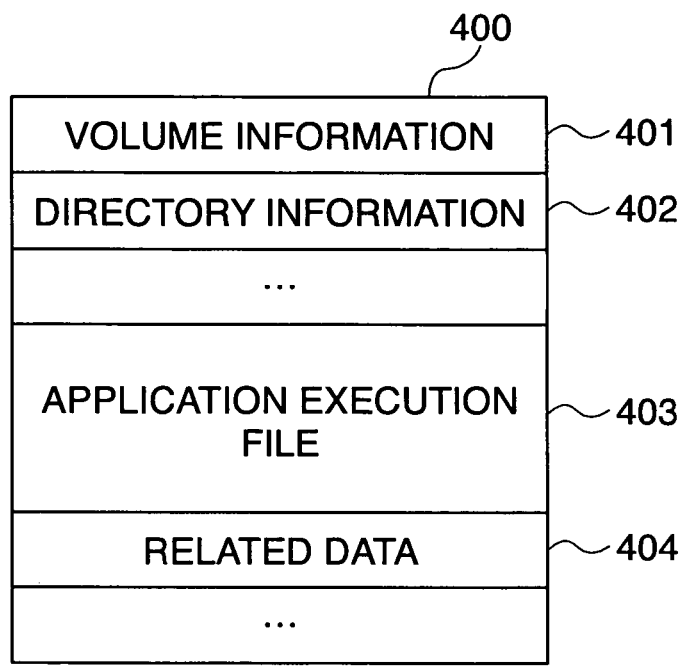
FIG. 4 is a diagram showing a memory map assumed in a state in which the job management program and related data appearing in FIG. 3 are stored on a storage medium.

FIG. 4 is a diagram showing a memory map assumed in a state in which the job management program and related data shown in FIG. 3 are stored on a storage medium. A storage area 400 on the FD or CD-ROM storage medium is comprised of volume information 401, directory information 402, a job management program execution file 403 and a job account-related data file 404.

Figure 5:
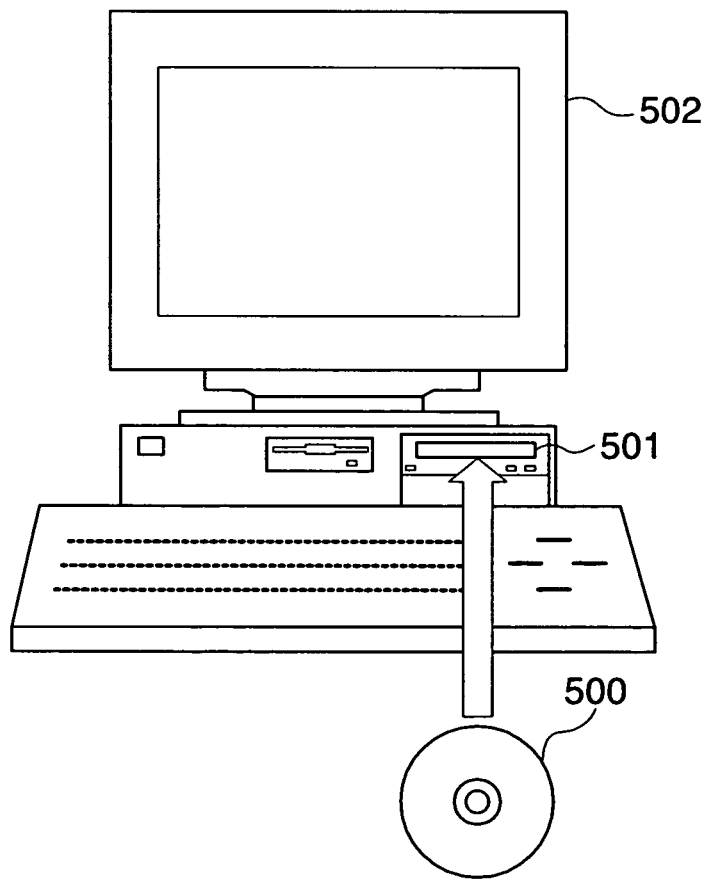
FIG. 5 is a diagram useful in explaining a method of supplying the program and data shown in FIG. 4 to a computer.

It should be noted that the storage medium (FIG. 4) on which a program code of software (a control program) which realizes the functions of the present embodiment is stored, may be supplied to a computer like one shown in FIG. 5, and the CPU (CPU 201) of the computer may be caused to read out and execute the program code stored in the storage medium.

As a method of supplying the program and data shown in FIG. 4 to a computer, the method of storing the program and data on a CD-ROM 500 and supplying the CD-ROM 500 to a computer main unit 502 (through a CD-ROM driver 501) as shown in FIG. 5 is commonly used. FIG. 5 is a diagram useful in explaining the method of supplying the program and data shown in FIG. 4 to a computer. In this case, the program code itself read from the storage medium realizes the functions of the present embodiment, and hence the storage medium in which the program code is stored constitutes the present invention.

Examples of the storage medium for supplying the program code include not only a CD-ROM and a HD, but also a floppy (registered trademark) disk, a magneto-optical disk, a CD-R, a CD-RW, a DVD-ROM, a DVD-RAM, a DVD-RW, a magnetic tape, a non volatile memory card, and a ROM. Moreover, it is to be understood that the functions of the present embodiment may be accomplished not only by executing a program code read out by a computer, but also by causing an OS (operating system) or the like which operates on the computer to perform a part or all of the actual operations based on instructions of the program code.

Furthermore, it is to be understood that the functions of the present embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Figure 6:
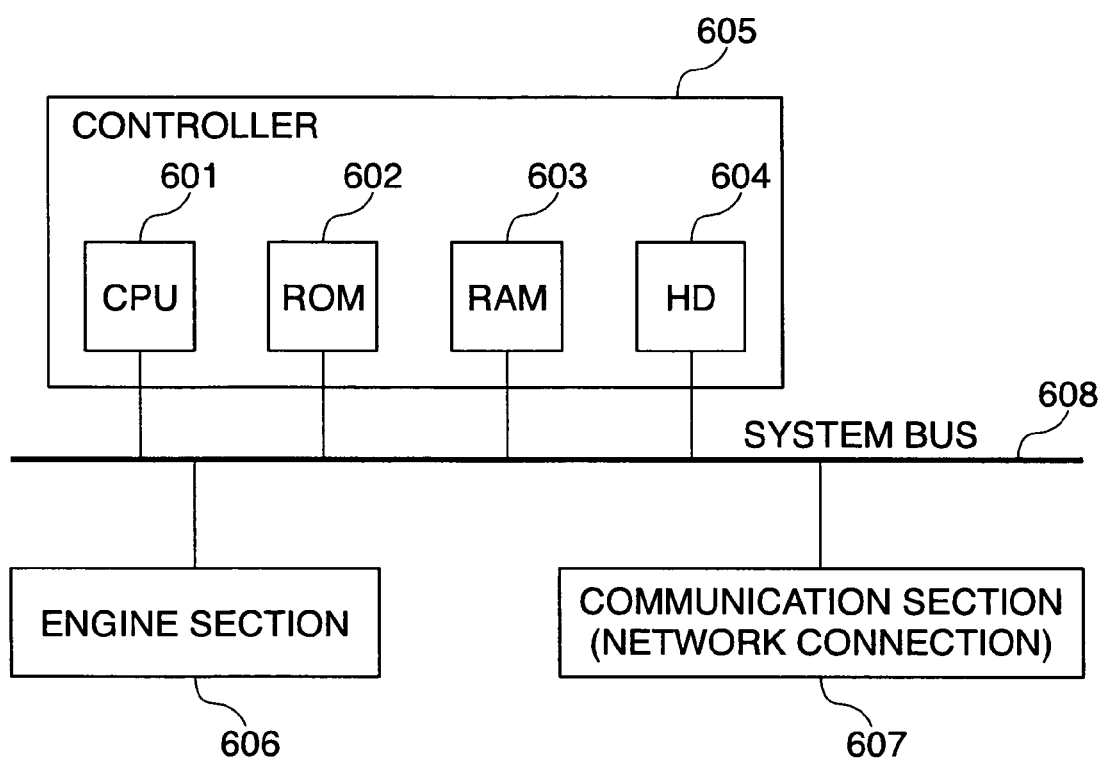
FIG. 6 is a block diagram schematically showing the arrangement of a peripheral device in the job account system shown in FIG. 1.

FIG. 6 is a block diagram schematically showing the arrangement of each of the peripheral devices in the job account system shown in FIG. 1. In FIG. 6, reference numeral 605 designates a controller that controls all the peripheral devices. The controller 605 is comprised of a CPU 601, a ROM 602, a RAM 603, and a HD 604.

The CPU 601 controls the controller 605 as a whole as well as all the components of the peripheral device and performs arithmetic calculations. The ROM 602 is a read-only memory and a storage area storing a system start-up program or the like. The RAM 603 is a random access memory and a data storage area. The HD 604 is a hard disk, and may be replaced by a nonvolatile storage device such as a SRAM. If the peripheral device is equipped with the job history storage function, a job history is stored in the RAM 603 or on the HD 604. OS, communication control programs, and engine control programs are loaded into the RAM 603 and executed by the CPU 601.

Reference numeral 606 designates a peripheral device engine section, which prints and scans under the control of the controller 605. Specifically, the engine section 606 is comprised of a printer engine, a scanner engine, or both of them.

Reference numeral 607 designates a communication section, which controls network communications. Through the communication section 607, the peripheral device can communicate with the computers 1010, 1020 and the central server computer 1030. Reference numeral 608 designates a system bus. Data exchanged between the aforementioned component elements is exchanged via the system bus 608.

Figure 7:
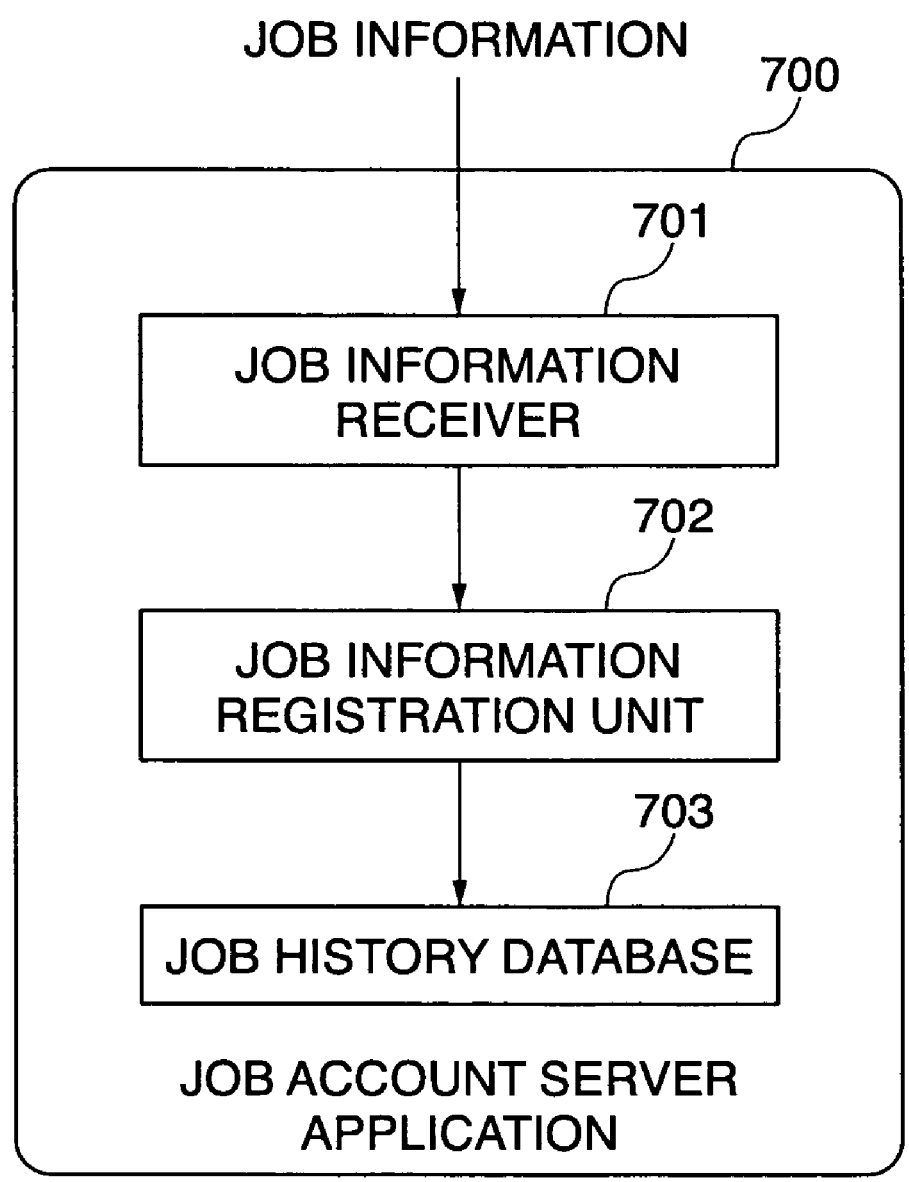
FIG. 7 is a diagram showing the functional arrangement of a job information management module of a job account server application appearing in FIG. 1.

FIG. 7 is a diagram showing the function and arrangement of the job information management module 1031c of the job account server application 1031 shown in FIG. 1. A job information receiver 701 obtains job information from the job account client applications 1014, 1024 of the client computers 1010, 1020 and the peripheral devices 1040 and 1050 which are equipped with the job history storage function through the network. A job information registration unit 702 registers the job information received by the job information receiver 701 in a job history database 703.

By checking the data in the job history database 703 it can be determined when, by whom, with which peripheral device and in what amounts (the number of pages, number of pages discharged, type of paper, etc.) a job has been executed, followed by detailed job accounting being executed.

Figure 8:
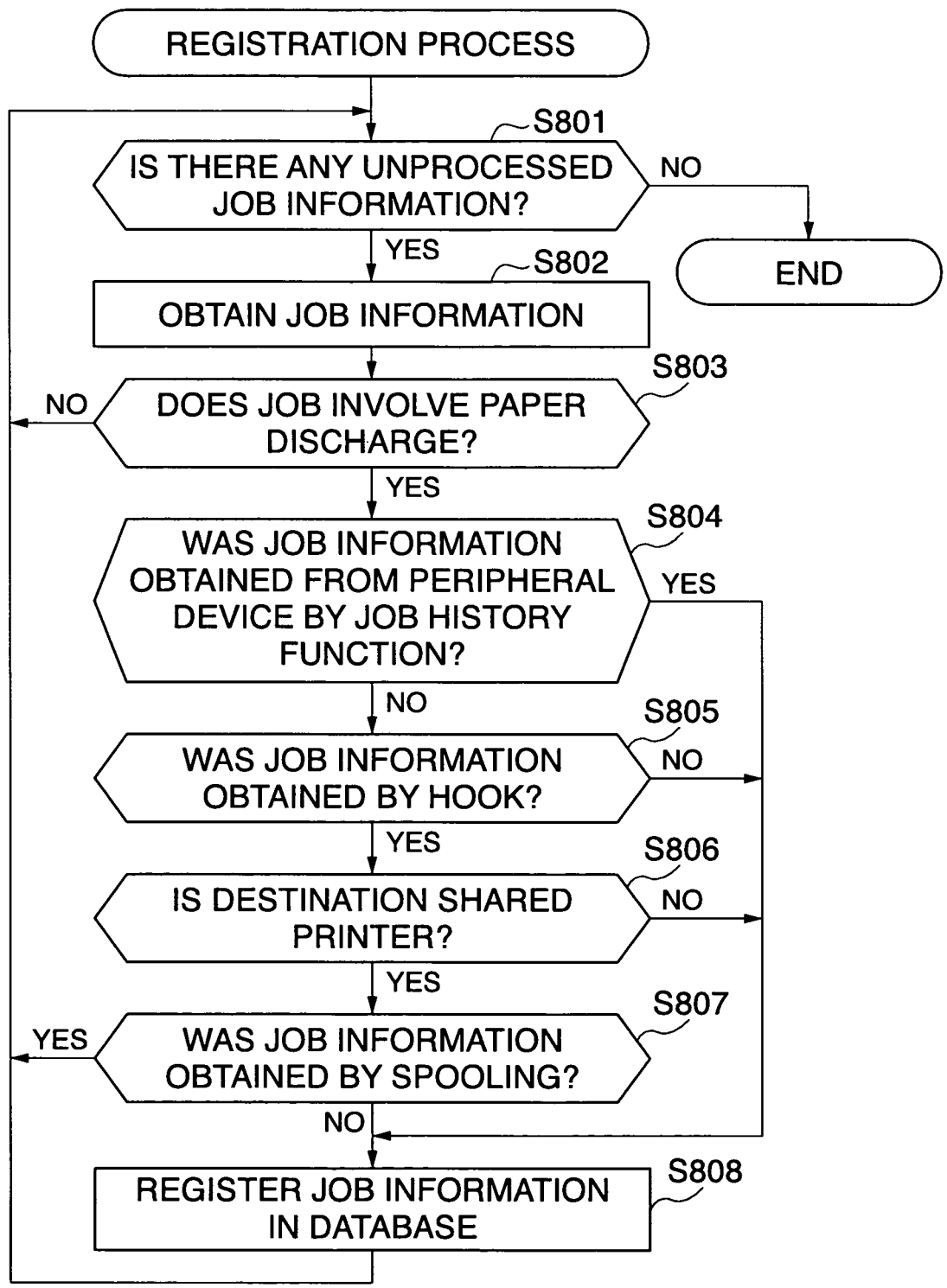
FIG. 8 is a flow chart showing a registration process executed when job information received by a job information receiver appearing in FIG. 7 is registered in a job history database by a job information registering section.

FIG. 8 is a flow chart showing a registration process executed when job information received by the job information receiver 701 shown in FIG. 7 is registered in the job history database 703 by the job information registering section 702.

First, it is determined whether or not there is job information on unprocessed job(s) in the job information receiver 701 (step S801). If there is no job information on unprocessed job(s), the present process is terminated. If there is job information on unprocessed job(s) in the job information receiver 701, the process then proceeds to a step S802, where the job information is obtained from the job information receiver 701.

Next, in a step S803, it is determined from the obtained job information whether or not the job involves the discharge of paper, and, if not, that is, if the job is not a print job, the process returns to the step S801. If the job does involve the discharge of paper, then the process proceeds to a step S804.

Processing from the step S804 to a step S808 is for registering job information in the database. In FIG. 1, in the case where the client computer 1020 works as a print server for the client computer 1010, job information generated at the client computer 1010 is sometimes transmitted from both the job account client application 1014 and the job account client application 1024 to the job account server application 1031 of the central server computer 1030. Therefore, filtering is carried out in steps S804 and S807 so that redundant job information is not registered in the job history database 703.

First, in the step S804, it is determined whether or not the job information obtained in the step S802 has been acquired by using the job history storage function of one of the peripheral devices. If the job information has been acquired from one of the peripheral devices, then the process directly proceeds to the step S808 because there is no risk of redundant registration and the job information is registered in the job history database 703. If the job information has not been acquired from one of the peripheral devices, then the process proceeds to a step S805, where it is determined whether or not the job information has been acquired by hook (hooking).

It should be noted that, as one method of determining whether or not the job information has been acquired by hooking, there is a method of determining by what OS job information has been acquired, because it is possible to determine whether or not job information has been acquired by hooking depending on the type of OS. For example, if OS1 is used as the OS on the client computer 1010 and OS2 is used as the OS on the client computer 1020, then if job information has been acquired by OS1, that job information has been acquired by hooking, and if the job information has been acquired by OS2, the job information has been acquired from the spooler 1023.

Where the job information has not been acquired by hooking, there is no risk of redundant registration, and the process jumps to the step S808, where the job information is registered in the job history database 703. Where the job information has been acquired by hooking, in a step S806 it is determined whether or not the job information indicates that a device to which the job is to be output is a shared printer. If the job information indicates that a device to which the job is to be output is not a shared printer, then there is no risk of redundant registration and the process jumps to the step S808, where the job information is registered in the job history database 703.

If the job information indicates that a device to which the job is to be output is a shared printer, then the process proceeds to the step S807, where it is determined whether or not the job information has been acquired from the spooler of the client computer acting as a print server managing the shared printer (for example, the client computer 1020). If the job information has not been acquired from the spooler, there is no risk of redundant registration and the process proceeds to the step S808, where the job information is registered in the job history database 703.

If the job information has been acquired from the spooler, then the process returns to the step S801.

FIG. 9 is a diagram showing an example of the job information registered in the job history database 703 shown in FIG. 7.

The database is composed of items and the contents thereof. Item 901 indicates a job output device, that is, by which peripheral device the job was processed. It should be noted that, where a job does not involve the discharge of paper, information indicating a file name (the job is scanning of original), information indicating that the job is a fax transmission, or information indicating that the job does not involve the discharge of paper, is recorded in the item 901.

Item 902 indicates a job information acquiring method. Methods of obtaining job information involve acquisition by hooking, acquisition by spooling, and acquisition using the job history storage function of a peripheral device.

Item 903 indicates the date and time of either the start or the finish of a job. Item 904 indicates the type of paper discharged. In the illustrated example, the type of paper is OHP. Item 905 indicates the number of pages output. In the illustrated example, 7 pages are output. Item 906 indicates the number of paper pages discharged. In the illustrated example, four pages of paper are discharged.

Item 907 indicates whether or not the job has been input to a shared printer from a client computer. Item 908 indicates the user name of the issuer of the job. Item 909 indicates whether the job is for a color printer or for a black-and-white printer. Item 910 indicates the name of printed document. Item 911 indicates whether the job is a single-sided print job or a double-sided print job. Item 912 indicates how many pages of information to print on a single side.

Figure 10:
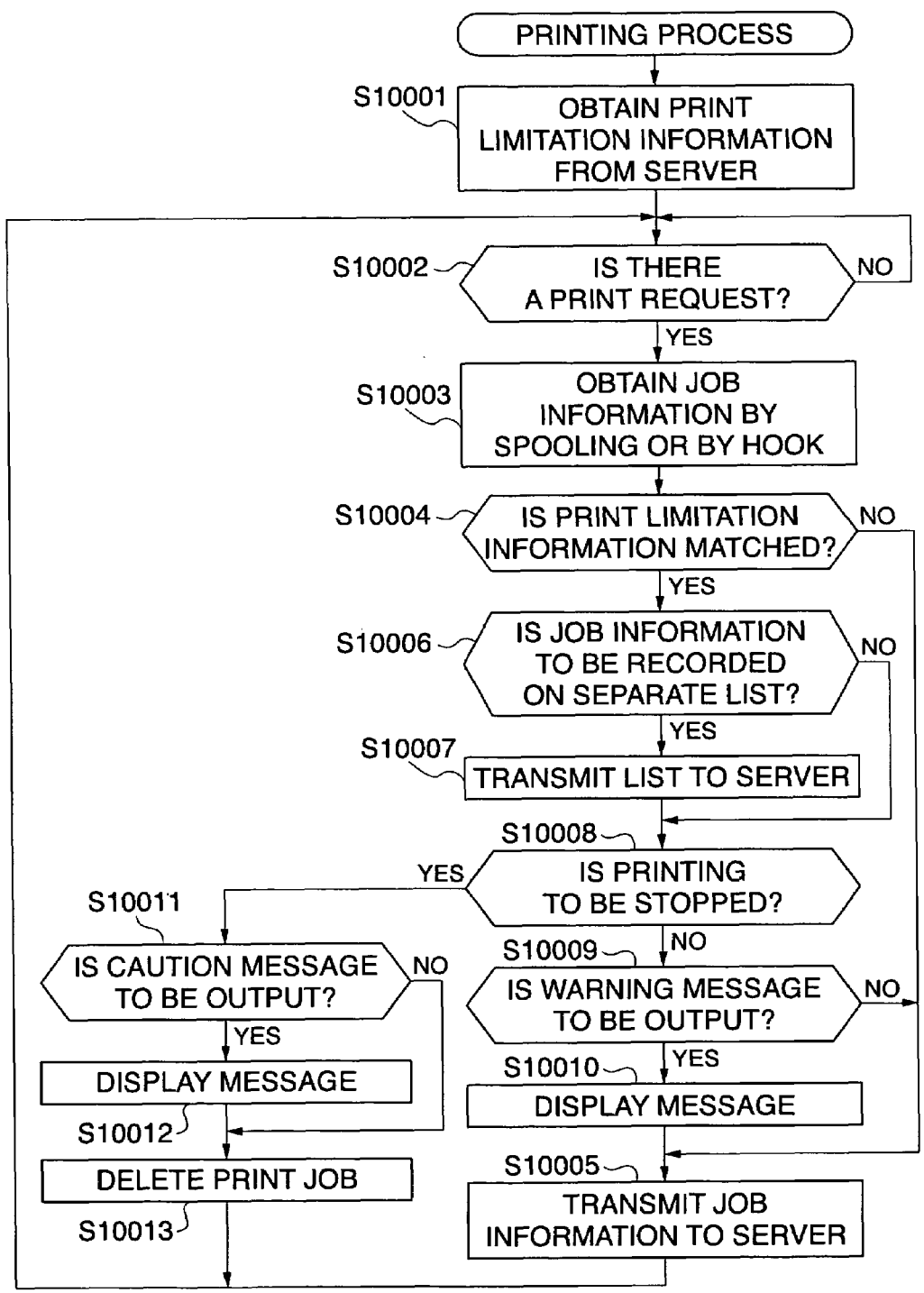
FIG. 10 is a flow chart showing a print process executed by the client computer appearing in FIG. 1.

FIG. 10 is a flow chart showing a print process carried out by the client computer 1010 (or 1020) shown in FIG. 1.

First, in a step S10001, when the client computer 1010 (or 1020) is started up, print limitation information previously set in the central server computer 1030 is obtained. The print limitation information is information such as an upper limit on the number of paper sheets or pages that a particular user can print, and/or names of documents inhibited from being printed from among names of documents designated for printing. Moreover, the print limitation information also contains such preset information as "Whether or not to allow printing", "Whether or not to save each piece of job information on a separate list", and "Whether or not to issue a warning message or a caution message to user."

Next, in a step S10002, it is determined, by spooling or by hooking, whether or not there is a print request from the application 1011 (or 1021) of the client computer 1010 (1020). The process proceeds to a step S10003 only when there is a print request, where the job account client application 1014 (or 1024) checks what kind of print request has been issued, by accessing the spooler or by hook, to obtain information indicating the kind of print request issued as job information.

Next, in a step S10004, a comparison is made between the print limitation information obtained in the step S10001 and the job information obtained in the step S10003, and it is determined whether or not the job information matches the print limitation information.

If the job information does not match the print limitation information, the process jumps to a step S10005, where the job information is transmitted to the job information management module 1031c of the central server computer 1030.

If the job information matches the print limitation information, the process proceeds to a step S10006, where it is determined, according to the setting information included in the print limitation information, whether or not to record the matching job information on a separate list.

If the setting is such as to record the job information on a separate list, the process proceeds to a step S10007. In the step S10007, the job information for which a separate list is to be created is transmitted to the job information management module 1031c of the central server computer 1030.

If as a result of the determination made in the step S10006 the setting is such that the job information is not to be recorded on a separate list, or if the step S10007 is completed, then in a step S10008, it is determined, according to the setting information included in the print limitation information, whether or not to stop printing corresponding to the job information that matches the print limitation information.

If the setting is such as not to stop printing, then in a step S10009, it is determined, from the setting information included in the print limitation information, whether or not to issue a warning message (notify) to the user.

If the setting is such as to issue a warning message, the process proceeds to a step S10010, where a warning dialog box is displayed on the display of the client computer 1010 (or 1020) indicating that the user is violating the print limitations.

If the setting is such as not to issue a warning message, or if the step S10010 is completed, then in the step S10005 the job information is transmitted to the job information management module 1031c of the central server computer 1030. Thereafter, the process returns to the step S10002 and continues to await a print request from the application.

If in the determination made in the step S10008 the setting is such as to stop printing due to the job information that matches the print limitation information, then in a step S10011, it is determined, from the setting information included in the print limitation information, whether or not to issue a caution message (notify) to the user.

If a caution message is issued, then in a step S10012 a warning dialog box indicating that the print job is to be deleted because the user has violated the print limitations is displayed on the display of the client computer 1010 (or 1020).

If the setting is such as not to issue a caution message, or if the step S10012 is completed, then in a step S10013 the hooked print job is deleted or the job is deleted by spooling. Thereafter, the process returns to the step S10002 to continue to await a print request from the application.

According to the above-described embodiment, as described above, by comparing print information (job information) obtained by spooling or by GDI hook and print limitation conditions (print limitation information) previously set by the manager and recording print information that violates the print limitation information as a list (FIG. 9) in a database. Therefore, a user who violates these print limitation conditions can be identified. As a result, print management can be carried out in a more secure and more detailed manner.

Moreover, since job information that violates the print limitation information, is allowed to be recorded on a separate list (so-called blacklist) but printing based on the job information is not inhibited, printing of print information that violates the print limitation conditions can be prevented without spoiling the easiness to use the system by the user.

CROSS REFERENCE TO RELATED APPLICATION

This application claims priority from Japanese Patent Application No. 2003-378454 filed Nov. 7, 2003, which is hereby incorporated by reference herein.

What is claimed is:

1. A job management system comprising:
   a network;
   a job management apparatus;
   at least one peripheral device connected to said job management apparatus through said network; and
   a plurality of information processing apparatuses connected to said job management apparatus and said peripheral device through said network, said information processing apparatuses managing job information output therefrom to said peripheral device to thereby manage usage of said peripheral device,
   wherein said job management apparatus has a use limitation setting device that sets use limitation information for limiting usage of said peripheral device by said information processing apparatuses, the use limitation information including an instruction of suspending printing when a use limitation of said peripheral device is violated or an instruction of continuing printing with the job information recorded on a list when the use limitation of said peripheral device is violated, and
   wherein said information processing apparatuses each comprise:
   a use limitation information acquiring device that obtains the use limitation information from said job management apparatus;
   a use limitation violation recording device that records on a list print job information and user information of a user who violates a use limitation corresponding to the use limitation information during while a print job from the user is being output, when the use limitation information obtained by the use limitation information acquiring device includes the instruction of suspending printing with the job information recorded on the list when the use limitation of said peripheral device is violated; and
   a job canceling device that cancels a job from a user who violates the use limitation corresponding to the use limitation, when the use limitation information obtained by the use limitation information acquiring device includes an instruction of inhibiting printing when the use limitation of said peripheral device is violated.

2. An information processing apparatus that manages job information output therefrom to at least one peripheral device to thereby manage usage of the peripheral device, comprising:
   a use limitation information acquiring device that obtains use limitation information for limiting usage of the peripheral device, the use limitation information including an instruction of suspending printing when a use limitation of the peripheral device is violated or an instruction of continuing printing with the job information recorded on a list when the use limitation of the peripheral device is violated;
   a use limitation violation recording device that records on a list print job information and user information of a user who violates a use limitation corresponding to the use limitation information during while a print job from the user is being output, when the use limitation information obtained by the use limitation information acquiring device includes the instruction of suspending printing with the job information recorded on a list when the use limitation of the peripheral device is violated; and
   a job canceling device that cancels a job from a user who violates the use limitation corresponding to the use limitation, when the use limitation information obtained by the use limitation information acquiring device includes an instruction of inhibiting printing when the use limitation of the peripheral device is violated.

3. An information processing apparatus according to claim 2, wherein said use limitation violation recording device allows printing by a user who violates the use limitation corresponding to the use limitation information even when print job information and user information of the user who violates the use limitation are recorded on the list.

4. A job management method of managing a job output to at least one peripheral device to thereby manage usage of the peripheral device, the method comprising:
   a use limitation information acquiring step of obtaining use limitation information for limiting usage of the peripheral device, the use limitation information including an instruction of suspending printing when a use limitation of the peripheral device is violated or an instruction of continuing printing with job information recorded on a list when the use limitation of the peripheral device is violated;
   a use limitation violation recording step of recording on a list print job information and user information of a user who violates a use limitation corresponding to the use limitation information during while a print job from the user is being output, when the use limitation information obtained in the use limitation information acquiring step includes the instruction of suspending printing with the job information recorded on a list when the use limitation of the peripheral device is violated; and
   a job canceling step of canceling a job from a user who violates the use limitation corresponding to the use limitation, when the use limitation information obtained in the use limitation information acquiring step includes an instruction of inhibiting printing when the use limitation of the peripheral device is violated.

5. A job management method according to claim 4, wherein the peripheral device is one selected from the group consisting of a printer, a copier, and a scanner.

6. A job management method according to claim 4, wherein said use limitation violation recording step allows printing by a user who violates the use limitation corresponding to the use limitation information even when print job information and user information of the user who violates the use limitation are recorded on the list.

7. A computer-readable storage medium storing a computer program that causes a computer to execute a job management method of managing a job output to at least one peripheral device to thereby manage usage of the peripheral device, comprising:

a use limitation information acquiring step of obtaining use limitation information for limiting usage of the peripheral device, the use limitation information including an instruction of suspending printing when a use limitation of the peripheral device is violated or an instruction of continuing printing with job information recorded on a list when the use limitation of the peripheral device is violated;

a use limitation violation recording step of recording on a list print job information and user information of a user who violates a use limitation corresponding to the use limitation information during while a print job from the user is being output, when the use limitation information obtained in the use limitation information acquiring step includes the instruction of suspending printing with the job information recorded on a list when the use limitation of the peripheral device is violated; and a job canceling step of canceling a job from a user who violates the use limitation corresponding to the use limitation, when the use limitation information obtained in the use limitation information acquiring step includes the instruction of inhibiting printing when the use limitation of the peripheral device is violated.

8. A computer-readable storage medium storing a job management computer program that causes a computer to control a job management for at least one peripheral device to thereby manage use of the peripheral device, the computer program comprising:

a use limitation information acquiring module that obtains use limitation information for limiting usage of the peripheral device, the use limitation information including an instruction of suspending printing when a use limitation of the peripheral device is violated or an instruction of continuing printing with job information recorded on a list when the use limitation of the peripheral device is violated;

a use limitation violation recording module that records on a list print job information and user information of a user who violates a use limitation corresponding to the use limitation information during while a print job from the user is being output, when the use limitation information obtained by the use limitation information acquiring module includes the instruction of suspending printing with the job information recorded on a list when the use limitation of the peripheral device is violated; and a job canceling module that cancels a job from a user who violates the use limitation corresponding to the use limitation, when the use limitation information obtained by the use limitation information acquiring module includes an instruction of inhibiting printing when the use limitation of the peripheral device is violated.

9. An information processing apparatus that manages job information output to at least one peripheral device to thereby manage usage of the peripheral device, comprising:

use limitation information acquisition means for obtaining use limitation information for limiting usage of the peripheral device, the use limitation information including an instruction of suspending printing when a use limitation of said peripheral device is violated or an instruction of continuing printing with the job information recorded on a list when the use limitation of the peripheral device is violated;

use limitation violation recording means for recording on a list print job information and user information of a user who violates use limitations corresponding to the use limitation information during while a print job from the user is being output, when the use limitation information obtained by the use limitation information acquisition means includes the instruction of suspending printing with the job information recorded on a list when the use limitation of the peripheral device is violated; and job canceling means for canceling a job from a user who violates the use limitation corresponding to the use limitation, when the use limitation information obtained by the use limitation information acquisition means includes an instruction of inhibiting printing when the use limitation of the peripheral device is violated.

* * * * *